(12) United States Patent
Wahl et al.

(10) Patent No.: US 6,826,847 B2
(45) Date of Patent: Dec. 7, 2004

(54) POSITION MEASURING SYSTEM

(75) Inventors: Claudia Wahl, Heilbronn (DE); Andrea Golowin, Weinsberg (DE); Rosemarie Bauer, Tamm (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/322,379

(22) Filed: Dec. 17, 2002

(65) Prior Publication Data

US 2003/0159305 A1 Aug. 28, 2003

(30) Foreign Application Priority Data

Dec. 17, 2001 (DE) .......................................... 101 62 068

(51) Int. Cl.$^7$ ............................................. G01B 21/00
(52) U.S. Cl. ...................................................... 33/706
(58) Field of Search .......................... 33/707, 706, 708

(56) References Cited

U.S. PATENT DOCUMENTS

| | | | | |
|---|---|---|---|---|
| 5,979,238 A | * | 11/1999 | Boege et al. .................. 73/490 |
| 6,049,992 A | * | 4/2000 | Freitag et al. ................. 33/700 |
| 6,442,861 B1 | * | 9/2002 | Boge et al. .................... 33/706 |
| 6,571,486 B1 | * | 6/2003 | Tondorf et al. ................ 33/706 |
| 6,578,284 B2 | * | 6/2003 | Kawada ........................ 33/706 |

FOREIGN PATENT DOCUMENTS

| | | |
|---|---|---|
| DE | 199 39 659 A1 | 2/2001 |
| DE | 10064734 * | 7/2002 |
| WO | WO 02/052220 A2 | 7/2002 |

OTHER PUBLICATIONS

"Magnetisches Langenmesssystem MS01—Technisches Handbuch," published by Noesis, pp. 1–18. While the publication date is unknown, it is believed that the technical handbook was published prior to Dec. 17, 2002.

* cited by examiner

Primary Examiner—Christopher W. Fulton
Assistant Examiner—Tania C. Courson
(74) Attorney, Agent, or Firm—Brinks Hofer Gilson & Lione

(57) ABSTRACT

A support body designed in accordance with a support body that includes a groove with lateral wall areas cut into a support body and a profiled unit. The profiled unit including a profiled area attached to both a cover flange with a laterally protruding contact area and a scale, wherein the profiled area is inserted in a releasably fixable manner into the groove from an open side of the groove, and while the profiled area is inserted into the groove, alignment of the scale takes place by contact of the protruding contact area against the lateral wall areas at a top of the groove.

16 Claims, 4 Drawing Sheets

POSITION MEASURING SYSTEM

Applicants claim, under 35 U.S.C. §119, the benefit of priority of the filing date of Dec. 17, 2001 of a German patent application, copy attached, Ser. No. 101 62 068.3, filed on the aforementioned date, the entire contents of which is incorporated herein by reference.

BACKGROUND OF THE INVENTION

1. Field of the Invention

The present invention relates to a position measuring system having a scale which can be arranged with the aid of a groove provided on a profiled element or guide profile.

2. Discussion of Related Art

Position measuring systems of this type are employed in many areas, for example in connection with measuring apparatus, machine tools, metal-working machines, laser installations, positioning installations, wood-working machines, automatic hard-facing machines, handling installations, welding installations, eroding installations, presses, hoists, elevators, and the like.

Moreover, areas of employment for such measuring systems lie in the determination of positions on linear axes, linear motors and movable units.

In these cases a particularly great measuring accuracy, extending into the nanometer range, is demanded in many areas.

Problems in detecting the results of measurements can be caused, for example, by swarf, fog from coolants, solvents, oil, grease, water and mechanical wear.

Linear measuring systems of the type mentioned at the outset are known, which were documented in a catalog "Magnetisches Längenmess-System MS01-Technisches Handbuch" [Manual—Magnetic Linear Measuring System MS01] by Noesis. The measuring system employed there includes a scale embedded in a groove, a connecting cable and an evaluation system composed of a sensor head and electronic evaluation device. The sensor head detects the position while being moved over the scale. In the process, the sensor detects information from magnetic fields and passes these signals on to the electronic evaluation device. The electronic evaluation device processes these signals into interface-usable protocols for the exact position determination.

A problem with known linear measuring system lies in that in case of repairs they cannot be exchanged if they are permanently integrated in the respectively existing component or in the machine. To protect the scales against swarf, fog from coolants, solvents, oil, grease, water and mechanical wear, they are integrated in closed spaces, which for disassembly, or reassembly, cannot be opened without damage, i.e. the parts surrounding the space, in particular along the measurement axis, of known linear measuring devices cannot be used again as a whole, or without reworking.

A linear measuring system is known from DE 199 39 659 A1, wherein the scale is embodied as a flexible component, which is surrounded by a flexible encapsulation which completely surrounds the scale.

A linear measuring system is described in the not pre-published WO 02/052220 A2, whose priorities are DE 100 64 734 and DE 201 10 905, wherein a conduit, which is only accessible from the front is provided, into which a measuring tape can be inserted and fixed in place.

OBJECT AND SUMMARY OF THE INVENTION

Based on the mentioned prior art, an object of the present invention, or the technical problem on which it is based, is to disclose a position measuring system which, while maintaining a high degree of accuracy and dependability, assures efficient manufacture and simple exchange, wherein at the same time the processing outlay for producing the groove at the guide profile can be clearly reduced.

This object is attained by a support body designed in accordance with a support body that includes a groove with lateral wall areas cut into a support body and a profiled unit. The profiled unit including a profiled area attached to both a cover flange with a laterally protruding contact area and a scale, wherein the profiled area is inserted in a releasably fixable manner into the groove from an open side of the groove, and while the profiled area is inserted into the groove, alignment of the scale takes place by contact of the protruding contact area against the lateral wall areas at a top of the groove.

A position measuring system in accordance with the present invention is provided by a groove with lateral wall areas cut into a support body and a profiled unit. The profiled unit includes a profiled area attached to both a cover flange with a laterally protruding contact area and a scale, wherein the profiled area is inserted in a releasably fixable manner into the groove from an open side of the groove, and while the profiled area is inserted into the groove, alignment of the scale takes place by contact of the protruding contact area against the lateral wall areas at a top of the groove. The position measuring system further includes at least one sensor for scanning the scale.

A position measuring system in accordance with the present invention is also provided by a scale which is arranged in a groove provided on a profiled body. A profiled unit includes a hollow profiled area attached to a cover flange with a laterally protruding contact area, wherein the scale is releasably provided inside the hollow profiled area and the hollow profiled area is inserted into the groove from an open side of the groove in a manner where the scale is releasably fixed in place. With the profiled unit inserted into the groove, alignment of the scale takes place by contact of the protruding contact area against a lateral edge area on a top of the groove. At least one sensor which is moved along the scale and detects information stored on the scale and an evaluation unit that evaluates the information received from the at least one sensor.

The position measuring system of the present invention is advantageously distinguished in that a profiled unit is provided which, in cross section, has a hollow profiled area and a cover flange with two laterally protruding contact areas, wherein the scale is releasably provided within the hollow profiled area, the hollow profiled area can be releasably fixed in the groove from the open side of the latter and, when the profiled area has been inserted into the groove, the alignment of the scale takes place by the contact of the protruding contact areas of the profiled unit with the tops of the lateral edge areas of the groove.

This position measuring system is distinguished by an especially economical manufacture. The profiled unit can be separately produced. The scale can be inserted into the profiled unit in a simple way and, in case of repairs, pulled out of it again. A particularly large advantage lies in that the groove bottom in the guide profile need not be made with extremely high accuracy, since the alignment of the scale inside the groove takes place by the contact of the protruding contact areas of the cover flange with the top of the lateral edge area of the groove. These edge areas can be made with high accuracy at a substantially smaller cost in comparison with the groove bottom.

A particularly preferred embodiment is distinguished in that the hollow profiled area has a resilient wall which, with the profiled unit inserted into the groove, comes to rest in a fixing manner on undercut areas of the groove, in particular inclined surfaces of the latter.

In a particularly preferred embodiment variation, the wall of the hollow profiled area of the profiled unit is embodied in such a way that the profiled unit can be inserted into the groove by applying a vacuum to the interior of the hollow profiled area.

A particularly advantageous further development, which assures a simple and problem-free removal, is distinguished in that the wall of the hollow profiled area of the profiled unit is embodied in such a way that the profiled unit can be removed from the groove without problems when an overpressure is introduced into the hollow profiled area.

For assuring an exact positioning of the scale inside the groove, or inside the profiled unit in a simple way, a particularly preferred embodiment is distinguished in that, when the profiled unit has been inserted into the groove, the resilient wall of the hollow profiled area fixes the scale in place inside the hollow profiled area.

In accordance with an advantageous embodiment of the measuring system of the present invention it is also possible to releasably clip or snap the profiled unit into the groove from the direction of the open side of the latter.

Metallic materials or plastics, in particular extrudable plastics, are preferable choices for the profiled unit.

The measuring system in accordance with the present invention can be employed without any problems in a magnetic, inductive or optical measuring system.

Further embodiments and advantages of the present invention ensue by combining various elements described and claimed in the present application with each other in any desired way, as long as they do not obviously cancel each other.

The present invention, as well as advantageous embodiments and further developments thereof will be described in greater detail and explained in what follows by the examples represented in the drawings. The characteristics which can be taken from the specification and the drawings can be used in accordance with the present invention individually or together in any desired combination.

The idea on which the present invention is based will be described in greater detail by exemplary embodiments represented in the drawings.

DETAILED DESCRIPTION OF THE PREFERRED EMBODIMENTS

Figure 2:
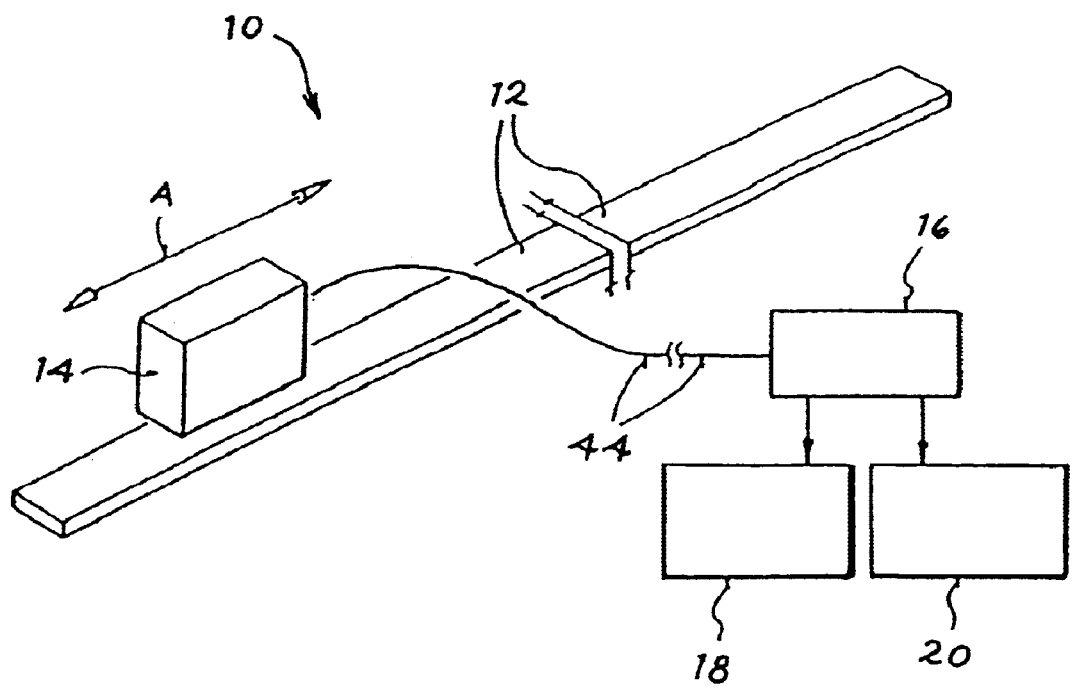
FIG. 2 is a greatly schematized representation of the basic principle of a linear measuring system in accordance with the prior art.

A linear measuring system 10 is schematically represented in FIG. 2, which shows the basic structure. A scale 12 is fastened on a component, not further represented, which is designed in the shape of a tape and has a ferrite material bonded in polymer in the exemplary embodiment represented. A magnetic alternating field is generated over the scale 12 by systematic magnetizing with alternating south and north poles. At the same time at least one sensor 14 exists, which scans the scale 12 by moving in the linear direction A of the latter. The sensor converts the field strengths existing at the magnetic scale 12 because of the changing magnetic field strength into signals, which it passes on to an electronic evaluation unit 16 via a connector cable 44. The evaluation unit 16 registers the signals arriving from the sensor 14 and evaluates them. The evaluated signals are conducted to a display unit 18, or a memory or further processing unit 20, for example. The measuring system can also be designed as an inductive or optical measuring system.

Figure 1:
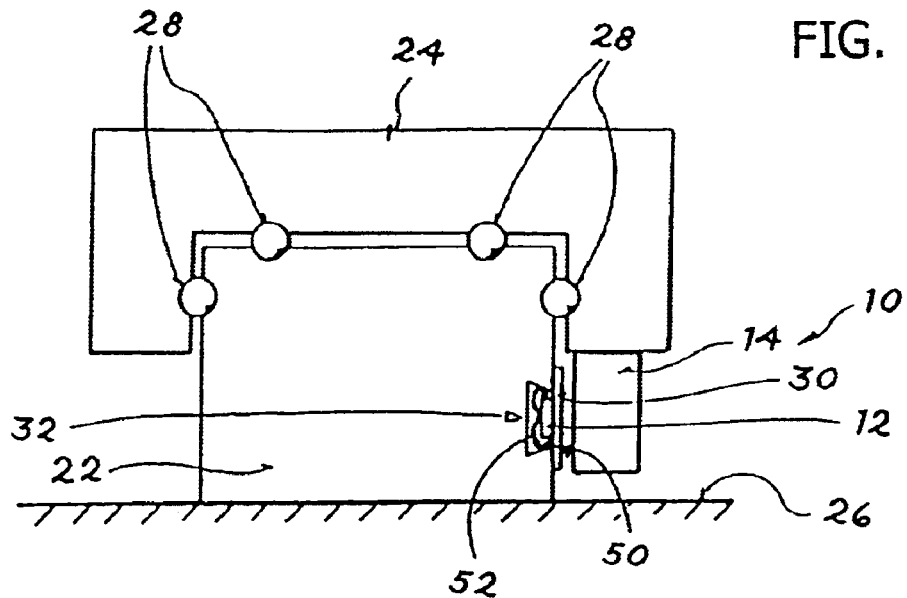
FIG. 1 shows a greatly schematized cross section through a guide profile with a carriage placed thereon, which is movable in the linear direction and whose position is determined by using a scale provided inside a groove in the guide profile, and whose information is detected via a sensor head fastened on the carriage wherein the scale is positioned via the linear measuring systems shown in FIGS. 3–5.

FIG. 1 shows a practical transfer of the employment of the linear measuring device of the invention in the form of a guide profile 22 as the support body of the scale 12, which is arranged on the base 26. A U-shaped carriage 24 is seated, linearly displaceable via ball bearings 28, above the rectangular-shaped guide profile 22. A groove 32 has been machined into the right lower lateral wall of the guide profile 22, in which a profiled unit 50 can be releasably inserted, on which, or in which the scale 12 is arranged.

The linear measuring system can also be arranged on a simple plate as a support body without a guide profile with a carriage being provided.

Directly on the exterior in front of the groove 32, a sensor 14 is arranged on the carriage 24 and scans, longitudinally displaceable with the carriage 24, a scale 12 located in the groove 32 for detecting the linear position.

Figure 3:
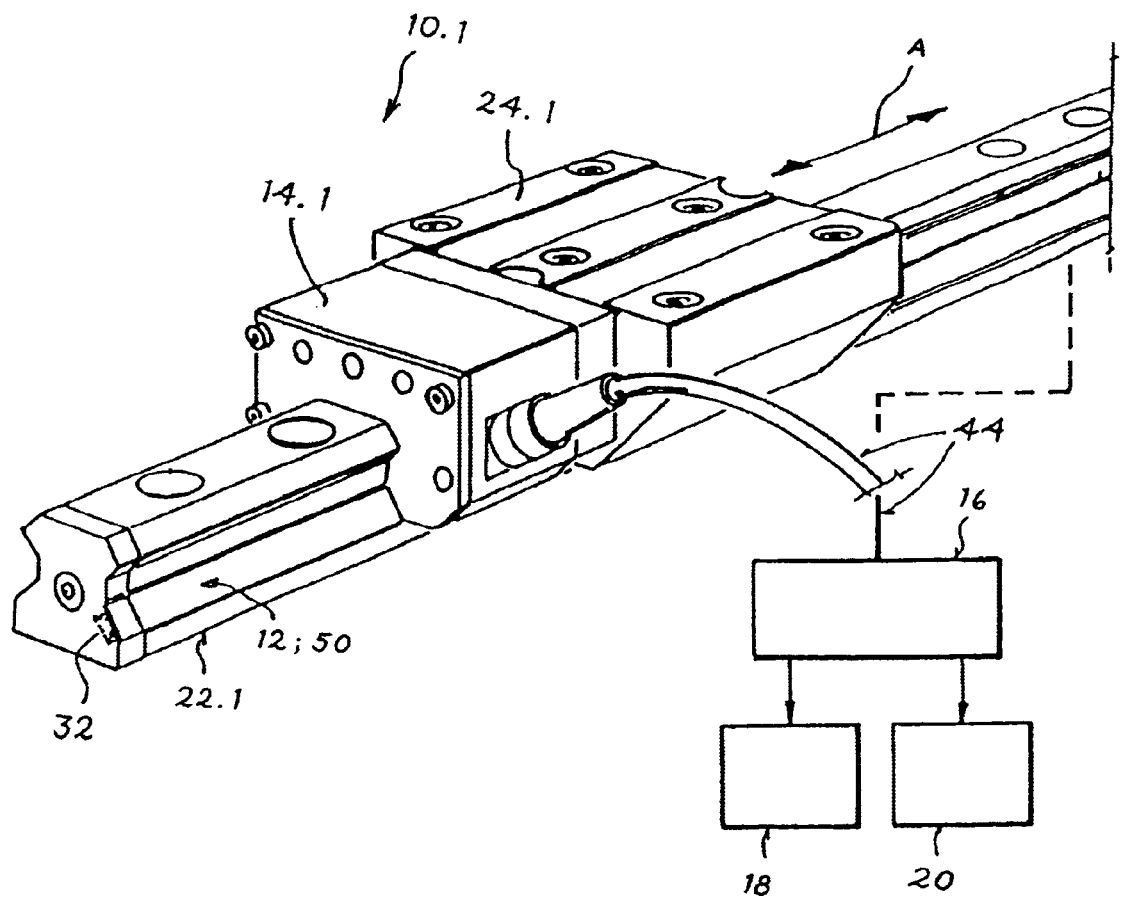
FIG. 3 is a schematic detailed perspective representation of an embodiment of a linear measuring system with a guide profile, carriage and a sensor head fastened on the side of the carriage in accordance with the present invention.

FIG. 3 schematically represents a detailed perspective view of a linear measuring system 10.1, which is basically constructed similar to the linear measuring system 10 in FIG. 1, but has a guide profile 22.1, whose cross section is different and has lateral U-shaped cutouts on each side. A carriage 24.1 is slidingly arranged on the guide profile 22.1, which is controlled by a motor and control units, not represented in detail, and can in this way be positioned in the linear direction A by appropriate inputs. A sensor 14.1 is connected to the side of the carriage 24.1 and also extends over the top of the guide profile 22.1, and by which the information signals from the scale 12 are detected. The scale 12 is provided inside a profiled unit 50, which is releasably arranged inside the groove 32 of the guide profile 22.1.

Figure 4A:
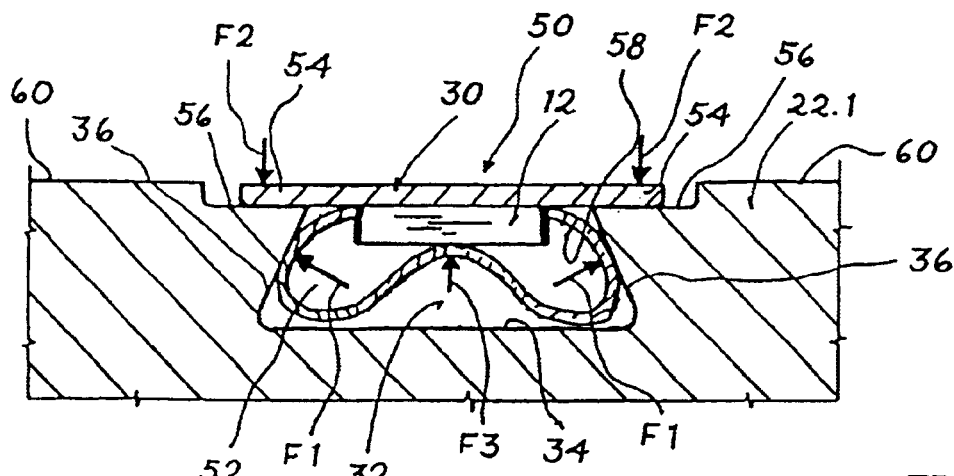
FIG. 4a shows a schematic detailed cross section in the area of a groove of an embodiment of a guide profile with a profiled unit, which can be releasably inserted into the groove and in which a scale is arranged, in the inserted state in accordance with the present invention.
Figure 4B:
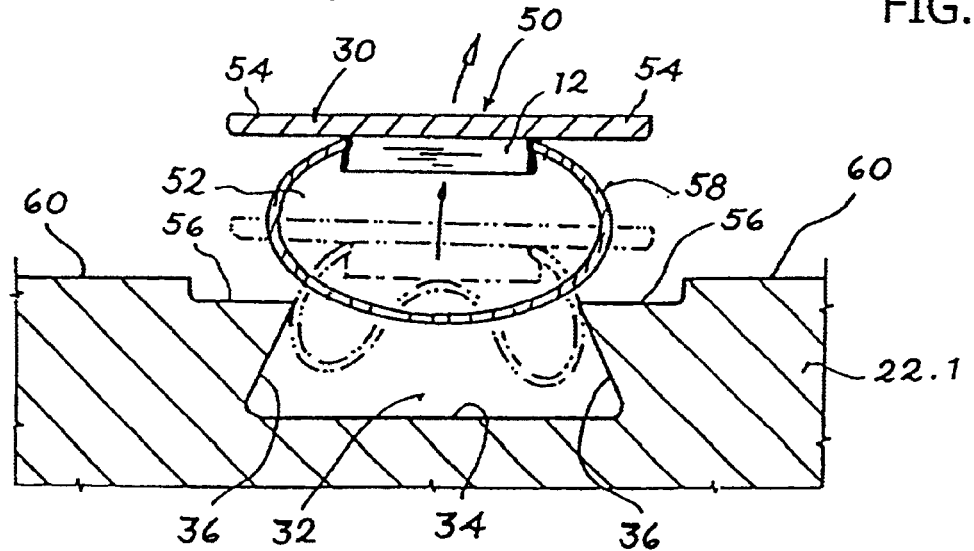
FIG. 4b shows the cross section in accordance with FIG. 4a in the removal state.
Figure 4C:
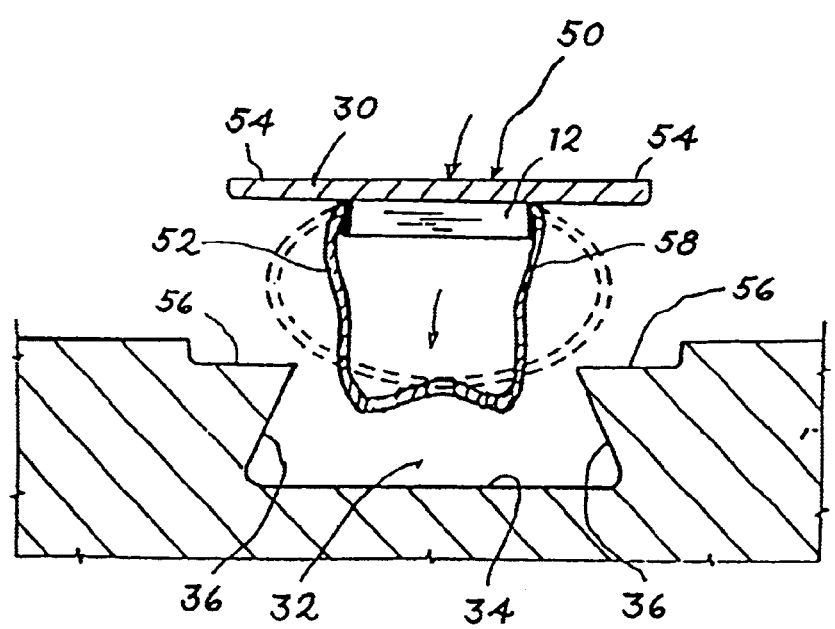
FIG. 4c shows the cross section in accordance with FIG. 4a in the inserting state.

An exemplary embodiment of a profiled unit 50 with the scale 12 is represented in FIGS. 4a, 4b and 4c, namely in the state where it is inserted into the groove 32 (FIG. 4a), in the removal state (FIG. 4b) and in the inserting state (FIG. 4c).

The groove 32 existing in the guide profile 22.1 has a groove bottom 34 and flanks 36, whose cross section tapers laterally toward the exterior. The beveled flanks 36 constitute an undercut area of the groove 32. The profiled unit 50 has a cover flange 30 with laterally protruding contact areas 54. A hollow profiled area 52 with a resilient wall 58 has been formed on the underside of the cover flange 50. The scale 12 is arranged inside the hollow profiled area 52.

In the inserted operating state in accordance with FIG. 4a, the hollow profiled area 52 is laterally convexly arched toward the exterior and is pressed with a force F1 against the groove flanks 36 of the groove 32. At the same time the contact areas 54 press with a force F2 against the tops of the lateral areas 56 of the groove 32. Furthermore, in the inserted state the lower area of the wall 58 of the hollow profiled area 52 is concavely inwardly arched because of its resilient properties, wherein this concave area exerts a force F3 on the scale 12, so that the latter is pressed against the underside of the cover flange 30 and is fixed in its position in this way. A great advantage of the represented embodiment of the profiled unit 50 lies in that in the inserted state the alignment of the scale 12 takes place by contact of the contact areas 54 with the lateral wall areas 56, and not because of the contact with the groove bottom 34. This is of great advantage with respect to the production of the groove 32, because the groove bottom need not be produced with great accuracy. The exact production of the lateral edge area 56 on the top demands substantially less outlay. Because of this the groove 32 can be produced with a substantially reduced manufacturing outlay, without the accuracy of the alignment of the scale 12 suffering because of this.

In accordance with an exemplary embodiment not represented in more detail, the lateral wall areas 56 can lie on one level with the top 60 of the guide profile 22.1 or a base 26 as support body.

If the profiled unit 50 is to be removed from the groove 32, an overpressure is applied to the sealed hollow profiled area 52, so that it arches upward and the profiled unit 50 as a whole can be removed (see FIG. 4b).

If the profiled unit 50 is to be inserted into the groove 32, in accordance with FIG. 4c a vacuum is applied to the sealed interior area of the hollow profile 52, so that the wall 59 of the hollow profiled area 52 is deformed in such a way that the hollow profiled area 52 can be inserted into the interior of the groove 32. Ambient pressure is again returned to the interior of the hollow profiled area 52 after the insertion, so that, because of the resilient properties of its wall 58, the hollow profiled area 52 is automatically fixed in the position inside the groove 32 represented in FIG. 4c.

Figure 5:
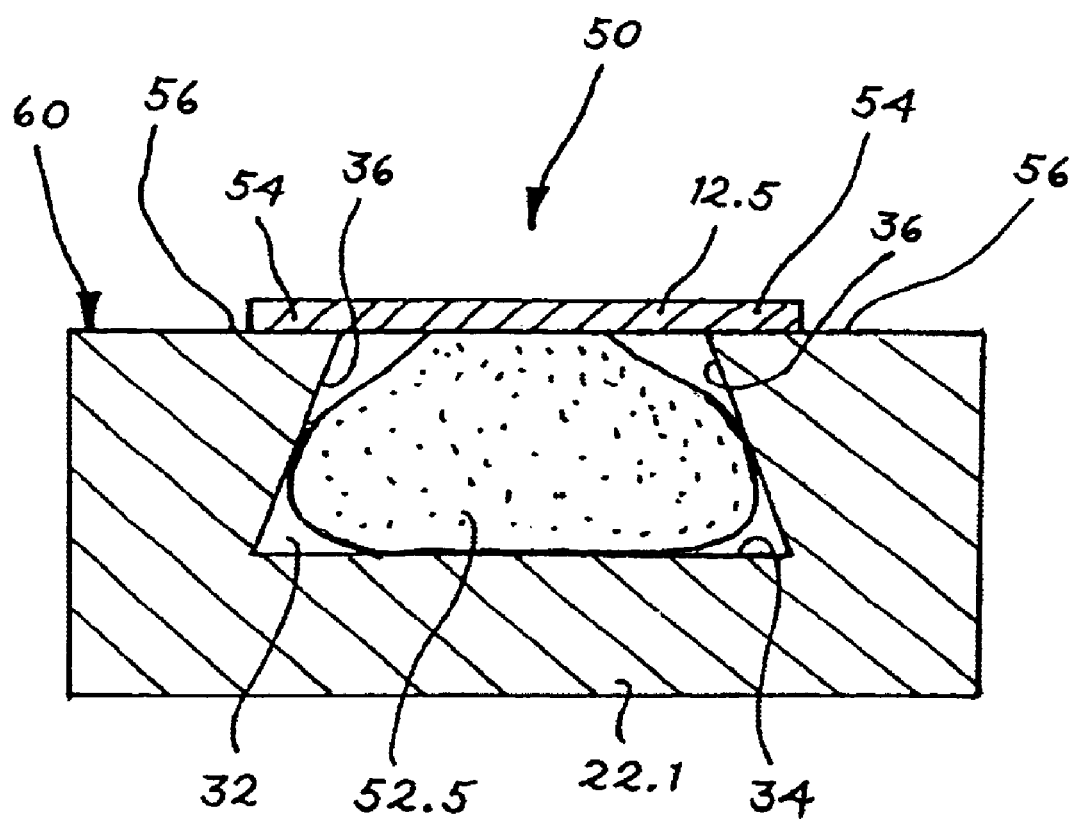
FIG. 5 represents a cross section through a second embodiment of a guide profile with a resilient profiled area and the scale as the cover flange in accordance with the present invention.

FIG. 5 shows a variation of the exemplary embodiments so far represented, wherein the scale 12.5 itself functions as the cover flange. The profiled area is a resilient body 52.5 which can be snapped into the groove 32 by resting against the undercut areas 36 of the groove 32, and exerting a holding force on the tape-shaped scale 12, which urges its contact areas 54 against the lateral wall areas 56 of the groove 32. Here, too, the profiled area can be designed as a hollow profile.

Within the scope of the present invention, further embodiment variations of course also exist besides the explained example.

We claim:

1. A support body with a scale, comprising:
    a top surface of a support body;
    a groove formed into said support body, said groove starts at said top surface;
    a profiled unit comprising:
        a profiled area attached to both a cover flange with a laterally protruding contact area and a scale, wherein said profiled area is inserted in a releasably fixable manner into said groove from an open side of said groove, and while said profiled area is inserted into said groove said cover flange covers said groove, and alignment of said scale takes place by contact and urging of said protruding contact area against said top surface outside of said groove.

2. The support body with a scale in accordance with claim 1, wherein said scale is in the shape of a tape.

3. The support body with a scale in accordance with claim 2, wherein said profiled area is resilient and is placed fixingly against undercut areas of said groove.

4. The support body with a scale in accordance with claim 1, wherein said profiled area is resilient and is placed fixingly against undercut areas of said groove.

5. The support body with a scale in accordance with claim 1, wherein said profiled area is clipped or snapped into said groove.

6. The support body with a scale in accordance with claim 1, wherein said profiled area is a hollow profiled area with a resilient wall.

7. The support body with a scale in accordance with claim 6, wherein said resilient wall is embodied in such a way that, when a vacuum is applied to said hollow profiled area, said profiled area is inserted into said groove.

8. The support body with a scale in accordance with claim 7, wherein said resilient wall is embodied in such a way that, when an overpressure is applied to said hollow profiled area, said profiled area can be removed from said groove.

9. The support body with a scale in accordance with claim 6, wherein said scale is releasably provided inside said hollow profiled area.

10. The support body with a scale in accordance with claim 9, wherein when said profiled unit is inserted into said groove, said resilient wall fixes said scale in place inside said hollow profiled area.

11. The support body with a scale in accordance with claim 10, wherein said wall of said hollow profiled area of said profiled unit is embodied in such a way that, when an overpressure is applied, said scale can be pulled out of said profiled unit.

12. The support body with a scale in accordance with claim 6, wherein said profiled area is made of a metallic material.

13. The support body with a scale in accordance with claim 6, wherein said profiled area is made of plastic.

14. The support body with a scale in accordance with claim 1, wherein said cover flange is said scale.

15. A position measuring system, comprising:
    a groove formed into a support body, said groove starts at a top surface of said support body;
    a profiled unit comprising:
        a profiled area attached to both a cover flange with a laterally protruding contact area and a scale, wherein said profiled area is inserted in a releasably fixable manner into said groove from an open side of said groove, and while said profiled area is inserted into said groove said cover flange covers said groove, and alignment of said scale takes place by contact and urging of said protruding contact area against said top surface outside of said groove; and
    at least one sensor for scanning said scale.

16. A position measuring system, comprising:

a scale which is arranged in a groove provided on a profiled body, wherein said groove starts from a top surface of said body;

a profiled unit comprising a hollow profiled area attached to a cover flange with a laterally protruding contact area, wherein said cover flange covers said groove and wherein said scale is releasably provided inside said hollow profiled area and said hollow profiled area is inserted into said groove from an open side of said groove in a manner where said scale is releasably fixed in place; and wherein with said profiled unit inserted into said groove, alignment of said scale takes place by contact and urging of said protruding contact area against said top surface outside of said groove;

at least one sensor which is moved along said scale and detects information stored on said scale; and an evaluation unit that evaluates said information received from said at least one sensor.

* * * * *